Aug. 4, 1964
J. REEF
3,142,907
CHECKING GAGE
Filed May 8, 1962
3 Sheets-Sheet 1
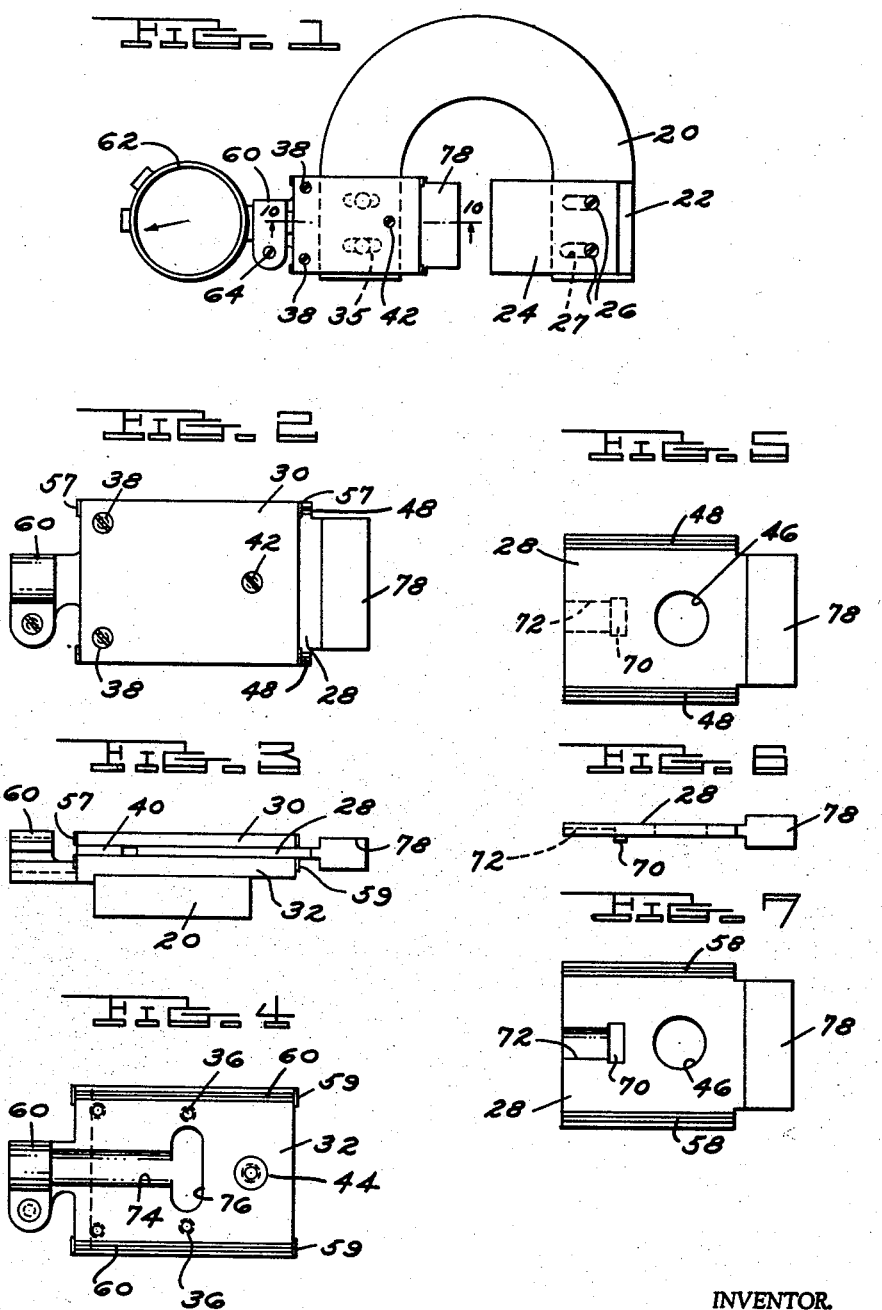
INVENTOR.
JAN REEF
BY
Burton & Parker
ATTORNEYS

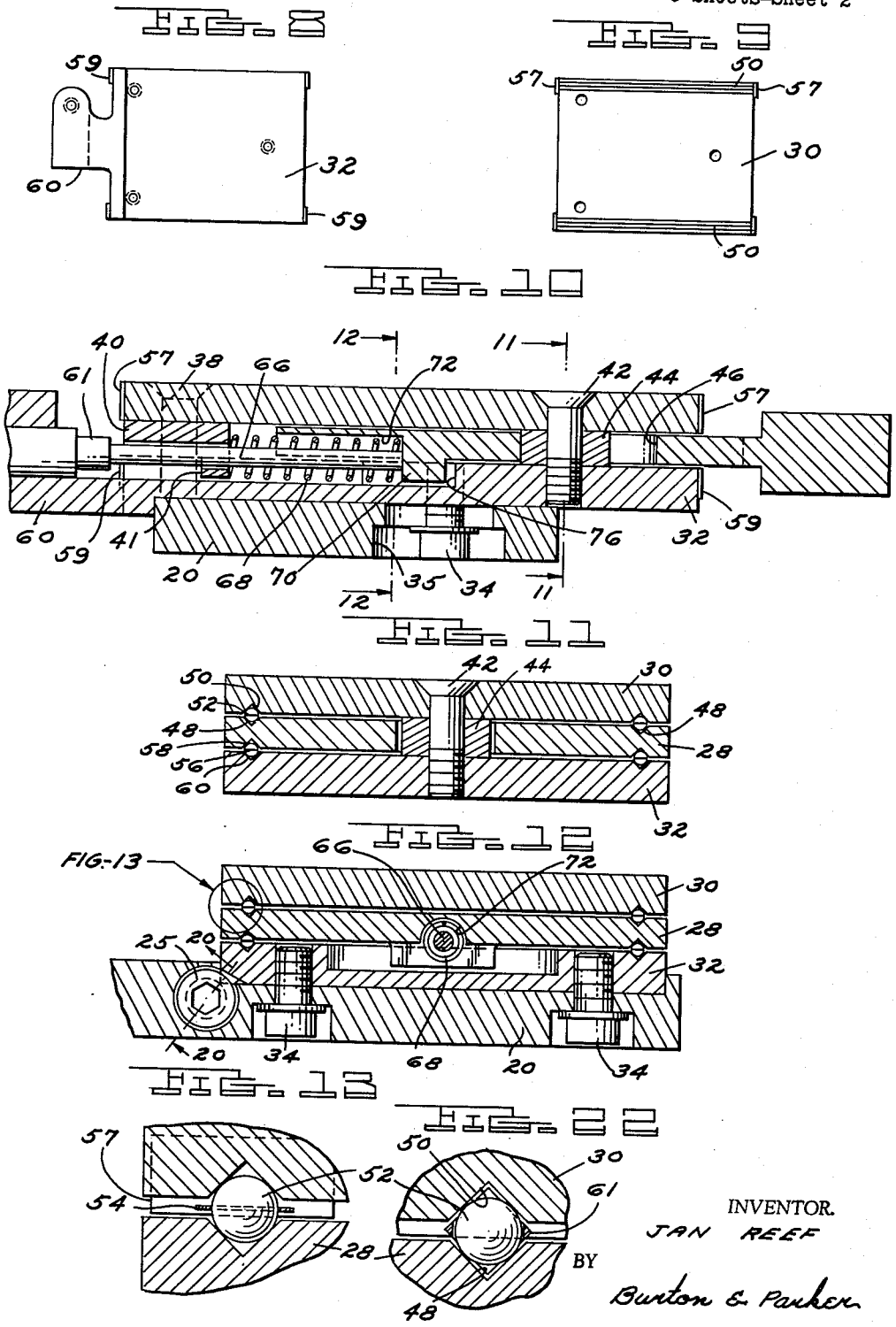

Aug. 4, 1964
J. REEF
3,142,907
CHECKING GAGE
Filed May 8, 1962
3 Sheets-Sheet 3
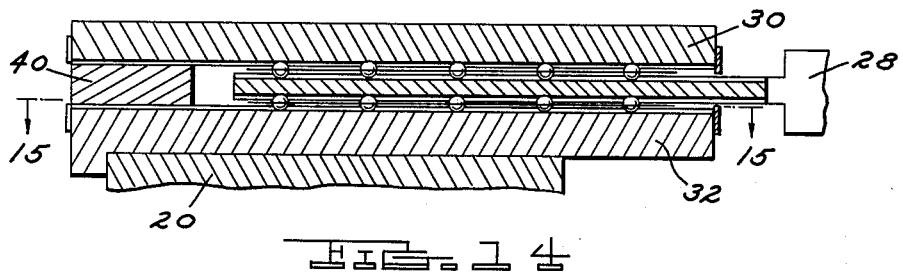
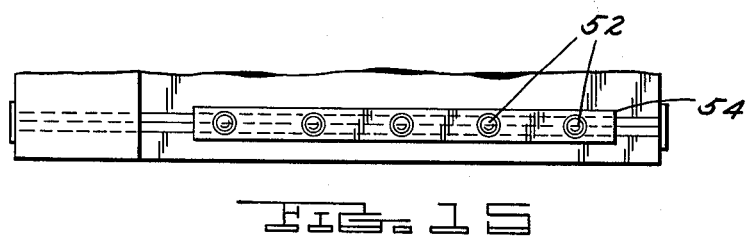
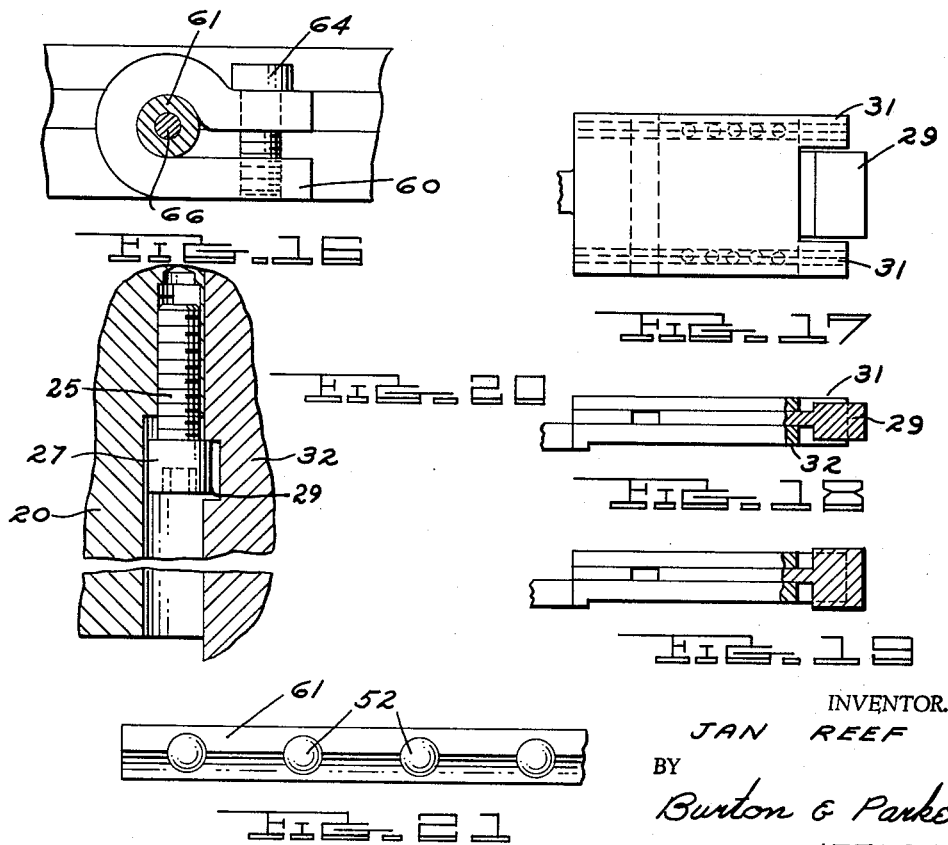
INVENTOR.
JAN REEF
BY
Burton G. Parker
ATTORNEYS United States Patent Office 3,142,907
Patented Aug. 4, 1964

3,142,907
CHECKING GAGE
Jan Reef, 41520 8-Mile Road, Northville, Mich.
Filed May 8, 1962, Ser. No. 193,099
7 Claims. (Cl. 33—147)

This invention relates to an improved gage and particularly to improvements in gages of a kind that lend themselves to rapid gaging of a part and to visible indication of the measurement made.

Generally, it is somewhat of the character shown in Patent No. 2,763,933 which illustrates a gage manufactured by applicant. Applicant is also the owner of Patents Nos. 2,562,124; 2,562,125; 2,747,288.

An object of this invention is the provision of a gage which comprises a U-shaped frame having opposed blades carried by the outer ends of the two arms of the U-shaped frame, which blades are disposed spaced apart to receive a part therebetween for gaging, and wherein one of the blades is resiliently slidably supported to be moved toward or away from the other blade; and wherein improvements are embodied to support the movable blade for accurate guided movement and also improvements are embodied which accurately reflect such guided movement.

Another object is the provision of a gage of the character described which is of a rugged sturdy construction that lends itself to general usage in a shop by different people. The gage is so built that it will withstand hard usage without getting out of order and without developing inaccuracies.

A further object is the provision of a gage assembly comprising a gage per se having movable gaging blades and which assembly includes as a part thereof and in addition to the gaging mechanism per se, a standard spring pressure gage having an indicating dial and a pointer connected with a plunger to respond thereto to swing the pointer over the dial, and which plunger is coupled with a slidable blade of the gage per se to transmit movement of the blade to the pointer.

More particularly, a meritorious feature of the invention is the provision of a gage of the character described wherein the movable blade is so supported for guided movement as to accurately reflect the measurement taken and wherein such blade is held at all times to move along an accurate path.

In one embodiment of the invention as shown in FIGS. 17 and 18, the projection of the slidable blade of the blade assembly beyond the protective guide plates of the assembly is protected by an extension of one of such guide plates as hereinafter described.

Other objects, advantages, and meritorious features will more fully appear from the following description, claims, and accompanying drawings, wherein:

FIG. 1 is a plan of the improved gage.

FIG. 2 is a plan of the movable blade assembly mounted upon the end of one arm of the gage frame.

FIG. 3 is a side eleavtion of the movable blade assembly shown in FIG. 2.

FIG. 4 is a plan view of the inside face of the bottom guide plate of the assembly shown in FIGS. 2 and 3.

FIG. 5 is a top plan view of the movable blade of the assembly shown in FIGS. 2 and 3.

FIG. 6 is a side elevation of the blade shown in FIG. 5.

FIG. 7 is a bottom plan view of the blade shown in FIGS. 5 and 6.

FIG. 8 is a bottom plan view of the bottom guide plate of the blade assembly shown in FIGS. 2 and 3.

FIG. 9 is a plan of the inside face of the top guide plate shown in FIGS. 2 and 3.

FIG. 10 is an enlarged sectional view taken on line 10—10 of FIG. 1 through the movable blade assembly.

FIG. 11 is a transverse sectional view taken on the line 11—11 of FIG. 10.

FIG. 12 is a transverse sectional view on the line 12—12 of FIG. 10.

FIG. 13 is a fragmentary sectional view taken on the same line as FIGS. 11 and 12 through a fragment of the movable blade and the opposed portion of a guide plate showing a ball bearing support for the blade.

FIG. 14 is a section on a line parallel to the view of FIG. 10 but along a line of one of the ball bearing assemblies.

FIG. 15 is a section taken on the line 15—15 of FIG. 14.

FIG. 16 is a fragment showing the clamp which connects the pressure gage to the movable blade assembly.

FIG. 17 is a view similar to FIG. 2 but showing a modified form of blade.

FIG. 18 is a side elevation of the construction shown in FIG. 17 but partly in section.

FIG. 19 is a side elevation of a modification of the construction shown in FIG. 18.

FIG. 20 is a sectional view on line 20—20 of FIG. 12.

FIG. 21 is a modification of the ball bearing structure shown in FIGS. 13 and 14.

FIG. 22 is a transverse section through the ball bearing assembly shown in FIG. 21.

In the drawings, the frame is shown at 20 and is a U-shaped or C-shaped member. On the outer end of one of its arms, in a cut out way 22 is mounted a manually adjustable blade 24 secured to the arm by screws 26. The screws extended through slots 27 in the arm, such slots 27 being shown in dotted outline in FIG. 1 thereby permitting adjustment of the blade manually transversely of the arm. The screws 26 may be loosened and the blade adjusted and then the screws tightened down. The opposite arm of the frame is provided with a blade assembly mounted thereon opposed to the blade 24 and aligned therewith. This assembly is likewise mounted in a cut out way in the end of the arm. It is likewise manually adjustable as an assembly transversely of the arm by an adjustment screw 25 as shown in FIGS. 12 and 20.

FIG. 20 is a section on line 20—20 of FIG. 12. The adjustment screw 25 is the same as that shown, described and claimed in applicant's U.S. Patent 2,747,288, dated May 29, 1956. This screw 25 has a head 27, FIG. 16, of sufficient diameter to engage in a slot 29 in the lower guide plate 32 of the blade assembly to actuate the same upon adjustment of the screw 25 and following withdrawal of holding screws 34.

The invention generally relates to this blade assembly and its connection with the pressure gage as hereinafter described.

This blade assembly comprises a blade element 28 sandwiched between a top guide plate 30 and a bottom guide plate 32. The bottom guide plate 32 is secured to the end of the arm by two screws 34 as shown particularly in FIGS 10 and 12. The openings in the frame arm are elongated as shown at 35 in FIG. 10. Release of these screws 34 permits adjustment of the assembly by screw 25 heretofore referred to, and tightening of the screws 34 repositions the assembly following its adjustment by screw 25. The screw openings for these screws 34 are shown in the guide plate and identified as 36 in FIG. 4.

The top guide plate 30 is secured to the bottom guide plate 32 by three screws; two of these screws are indicated as 38, FIGS. 1, 2, and 10. They extend as shown in FIG. 10 in dotted outline through the two guide plates and through a spacer bar indicated as 40 which serves to assist in spacing the guide plates apart. The thrid screw is indicated as 42. It is shown in FIGS. 2 and 10 as extending through the two guide plates and through a spacer plug 44 which plug is disposed within an aperture 46 within the slidable blade element 28. The aperture 46 in the blade is sufficiently oversize the plug as shown in FIG. 10 so that the blade may reciprocate thereover. This assembly is secured as heretofore described to the end of the frame arm by screws 34 and is adjustable transversely of the arm as heretofore described. Note its position in FIG. 10 differs from its position in FIG. 1.

It will be noted that there are a pair (upper and lower) of parallel linear ball bearing assemblies extending along and supporting the slidable blade 28 adjacent to each linear margin. The blade is provided on its top surface adjacent each linear margin with a ball bearing channel 48. The top guide plate is provided with an opposed ball bearing channel 50. A plurality of balls 52 carried by a strip 54 are mounted between said channels as shown in FIGS. 13 and 15. Between the blade and the bottom guide plate 32 are a similar plurality of balls 56 carried by a similar strip and similarly mounted between the channels 58 and 60 formed in the blade and the bottom guide plate 32 respectively as shown in FIGS. 13 and 15.

These ball bearings support the blade for free slidable movement toward and away from the manually adjustable blade 24. The screws 38 and 42 hold the top guide plate down against the spacer elements 40 and 44 and the assembly is sufficiently accurately formed so that a slight load may be placed upon the ball bearings whereby there is not permitted any looseness or play in the movement of the slidable blade, but its support is such that it is permitted free guided travel in and out with respect to the stationary blade.

Dust plates 57 and 59 are secured by soldering or in any suitable manner to the top and bottom guide plates 30 and 32 respectively, and at opposite ends thereof as shown in FIG. 10, etc. These dust plates extend over the spaces between the guide plates at the opposite ends of the ball races and terminate within say .001" of the slidable blade.

FIG. 21 shows a modification as follows: A bar 61 rectangular in cross section is seated in the two opposed ball receiving channels 48 and 50 of the upper surface of the blade 28 and the lower surface of the upper guide plate 30 respectively. A series of holes are drilled through such bar, one for each ball, and the balls 52 are disposed therein as shown in FIG. 2. A similar bar 61 equipped with holes in which balls 52 are disposed is seated within each of the two raceways formed between the lower surface of the blade and the upper surface of the lower guide plate. This bar as shown in section at the right in FIG. 22 will effectively exclude dust as it will be spaced but slightly from the surfaces of the raceways as determined by the projection of the balls therebeyond as shown in FIG. 22.

The bottom guide plate 32 has a rear extension shown in FIGS. 1, 2, 8, and 10 which receives the shank 63 of a dial gage indicated as 62. A tightening screw 64 may be used as shown in FIG. 16. The dial gage is conventional being provided with a pointer which sweeps over a dial and a plunger 66 shown in FIGS. 10, 12, and 16. FIGS. 10 and 12 best show this construction.

The spacer plate 40 is provided with a part 41 which has a passage way therethrough for the plunger 66 as shown in FIG. 10. A tension spring 68 encircles the plunger and one end of it bears against the part 41 of the spacer 40. The other end of the spring bears against a lug 70 of the blade 28. The spring itself is received in cored out passage-way 72 shown in FIGS. 6, 7, and 10, and also in FIG. 12. The bottom guide plate 32 is similarly cored out as at 74 to seat this spring.

The bottom guide plate is also cut away and exhibits a shoulder 76, FIG. 10, which shoulder 76 is adapted to form a stop to engage the part 70 of the blade 28 to limit the projection of the blade outwardly into the space between the frame arms. This spring 68 normally holds the blade projected as shown in FIG. 10. In FIG. 10, the projection of the blade into the space between the frame arms is limited by the spacer 44 as shown.

The blade is shown as having an outer edge 78 of greater thickness than the remaining portion of the blade. Note FIGS. 3, 6, and 10. This is to provide a better contact with a part being gaged.

It is apparent that initially the blade 24 would be manually adjusted as desired and the screws 26 tightened to position it at such adjusted point. It is apparent also that the slidable blade assembly is initially manually adjustable as hereinabove described by releasing the screws 34 and employing the adjustment screw 25 to adjust the assembly. It will be noted that in FIG. 1, the assembly is withdrawn outwardly to a point where the screws 38 that hold the top and bottom guide plates together are offset the boundary of the frame arm. In FIG. 10, however, the assembly has been moved inwardly so that these screws are shown as overlapping the frame arm.

In FIGS. 17 and 18, a modification is shown. The upper guide plate 30 is bifurcated and the extensions 31 overlap the reduced end of the blade. The blade, it will be seen, has a reduced projecting edge portion 29. This edge portion is of greater thickness as heretofore described and extends between and is protected by the extensions 31 of the top guide plate. The top guide plate, it will be noted, in this modification extends beyond the bottom guide plate 32 and it is these extending portions of the top guide plate that protect the blade against injury which might result from a part striking the same.

FIG. 19 shows a modification of the construction shown in FIG. 18, in that in FIG. 19 the blade is thicker than the overall thickness of the upper and lower guide plates. The blade 29 therefore projects above and below the two guide plates 31 and 32 by, for example, .002" to .003". This projection of the blade permits such projecting portion of the blade to be received within a groove for gaging the same.

What I claim is:

1. A gage comprising a generally U-shaped frame having a pair of opposed aligned arms, a blade mounted upon one arm adjacent to the end of the arm and extending transversely thereacross and projecting into the space between the arms, a blade assembly mounted upon and extending transversely across the other arm opposed to the blade of the first mentioned arm, said blade assembly comprising a blade sandwiched between connected and spaced apart top and bottom guide plates, said blade having slidable linear movement between the guide plates and beyond the ends thereof into the space between the arms and toward and away from the blade of the other arm, ball bearing means supporting the slidable blade for its linear slidable movement toward and away from the blade of the other arm, means yieldingly tensioning the slidable blade toward the blade of the other arm, a dial gage supported by the frame and having a plunger and indicator coupled with the plunger to register the movement thereof, said plunger having coupling engagement with the slidable blade of the blade assembly to be actuated thereby to register movement of the blade upon the indicator, said top and bottom guide plates being connected together in spaced apart relationship by spacer connecting means so as to permit slidable ball bearing supported movement of the blade between the plates, and said ball bearing support for the slidable blade comprising two pairs of ball bearings, one pair being disposed adjacent to each of the two linear margins of the blade.

2. A gage as defined in claim 1 characterized in that the ends of the arms of the frame are provided with blade supporting aligned ways extending transversely across the arms adjacent to the ends thereof, and the first mentioned blade is manually adjustable within its way transversely of its arm and the blade assembly which includes the slidable blade and the top and bottom guide plates is manually adjustable as a unit within its way transversely of its arm.

3. A gage as defined in claim 1 characterized in that the blade of the blade assembly and one of the guide plates of said assembly are provided with opposed cored out passageways within which a tension spring is seated encircling the dial gage plunger and opposite ends of this spring are seated against the blade and a part interposed between and secured to one of said guide plates and projecting into said cored out passageways tensioning the blade toward the blade of the other arm.

4. A gage as defined in claim 1 characterized in that one of the guide plates is provided with an inner end portion projecting beyond the other guide plate and overhanging the opposite linear edges of the blade forming a protective guard therefor.

5. A gage as defined in claim 1 characterized in that the upper guide plate is provided with a bifurcated extension the two forks of which project along opposite linear edges of the blade and the edge of the blade which extends between the two forks of the guide plate is of reduced width and of increased thickness as compared with the portion of the blade that is sandwiched between the two guide plates.

6. A gage as defined in claim 2 characterized in that the spacer connecting means includes spacer portions of a dimension which space the top and bottom guide plates apart sufficiently to permit slidable movement of the blade therebetween upon the roller bearings while holding the bearings against the blade sufficiently to impose a slight load thereupon.

7. A gage as defined in claim 1 characterized in that the spacer connecting means includes spacer portions of a dimension which space the top and bottom guide plates apart sufficiently to permit slidable movement of the blade therebetween upon the roller bearings while holding the bearings against the blade sufficiently to impose a slight load thereupon and further characterized in that said connecting means is adjustable to vary the pressure of the top and bottom guide plates against the ball bearings.

References Cited in the file of this patent
UNITED STATES PATENTS

| | | |
|---|---|---|
| 1,281,805 | Metzger et al. | Oct. 15, 1918 |
| 1,853,134 | Mischker | Apr. 12, 1932 |
| 1,892,969 | Schneider | Jan. 3, 1933 |
| 2,763,933 | Mussnig | Sept. 25, 1956 |
| 2,799,090 | Grzywna | July 16, 1957 |